Feb. 28, 1939. H. C. MORROW 2,148,706
PROTECTIVE TEMPERATURE MEASURING DEVICE FOR PICKLING TANKS
Filed Oct. 9, 1937
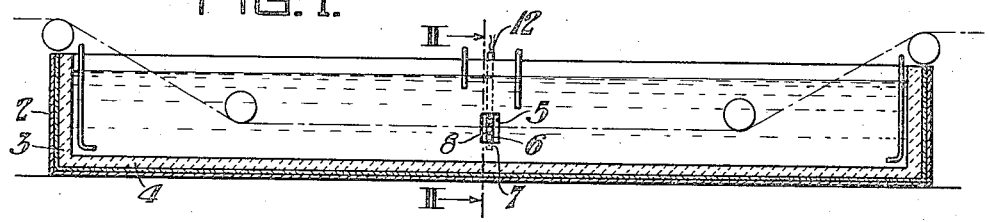
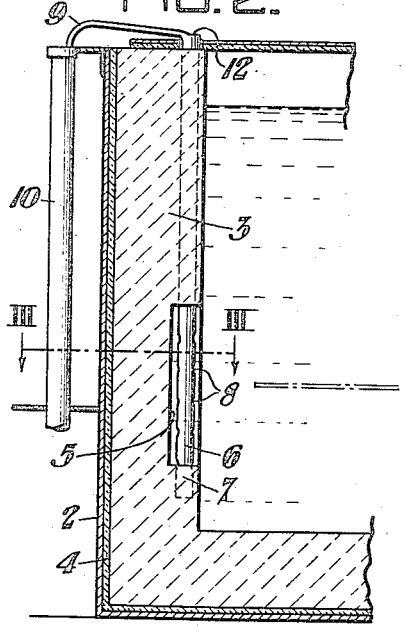
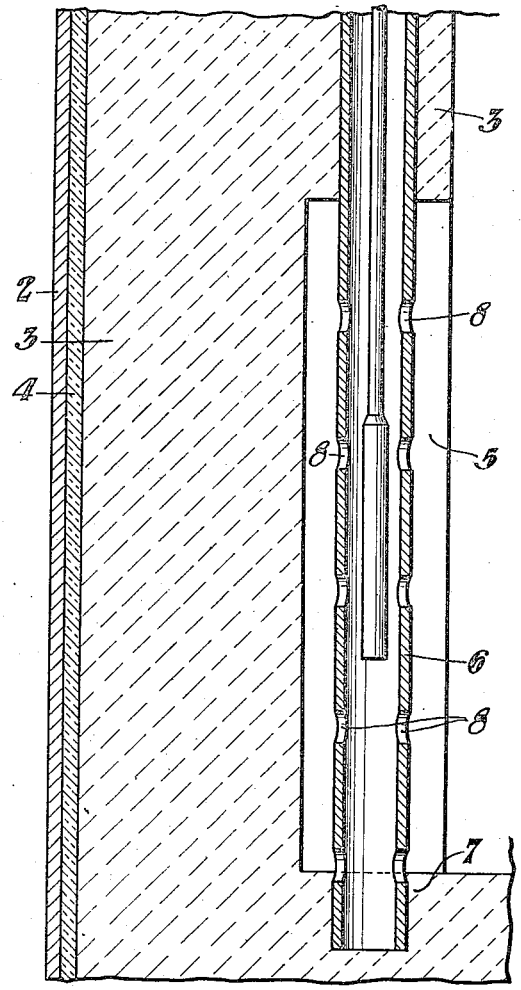
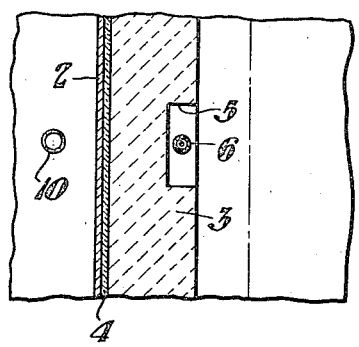
Inventor:
HARRY C. MORROW,
by: Usina & Lauber
his Attorneys.

Patented Feb. 28, 1939

2,148,706

UNITED STATES PATENT OFFICE 2,148,706

PROTECTIVE TEMPERATURE MEASURING DEVICE FOR PICKLING TANKS

Harry C. Morrow, Gary, Ind.

Application October 9, 1937, Serial No. 168,278

3 Claims. (Cl. 73—343)

This invention relates to pickling tanks, and particularly to a means of protecting the temperature recording instruments against breakage therein.

It is desired, for various reasons, to maintain some pickling solutions at a constant predetermined temperature. Various means have been employed to determine, record and keep, the temperature of the bath constant. Most common of these is an automatic temperature controller having a recording thermocouple, which is placed in the bath so as to instantly detect, record and correct the smallest variation in the solution temperature. Such temperature recording instruments are usually placed in the pickling tank at any accessible position and are subject to breakage or damage, especially when a continuous strip of metal is passed therethrough and are, of course, very expensive to replace or to repair. Such breakage increases the maintenance cost and the loss of temperature control for long periods of time, due to the fact that the temperature control device would have to be removed from the tank and repaired or replaced.

Many ways have been suggested for protecting the recording instruments against breakage as the material is pickled and the continuous metal strip passed through the pickling solution, such as, for example, the placing of a protective tube or device around the recording element in the bath. These protective tubes are usually made of rubber, vitreous tile or a Monel metal in the form of a pipe in which the recording element is adapted to be inserted and housed. Protective tubes or pipes made of such materials do not last long and would have to be frequently replaced for the reason that the acid in the bath, which is usually sulphuric, attacks the metal or material of which the protective tube is made and in a short time destroys it.

It is an object of this invention to provide an improved protective tube for use in pickling tanks in which the recording element or device can be placed or housed, at the same time allowing the pickling solution to freely circulate therethrough and around.

It is another object of this invention to provide a protective tube which the acid of the bath will not attack and which is rigidly and securely held in position at all times in the solution.

It is a further object of this invention to provide an improved protective tube for safely housing recording instruments in pickling tanks which is inexpensive and easy to install and, at the same time, efficient and effective in operation.

Various other objects and advantages of this invention will become more apparent during the course of the following specification and will be particularly pointed out in the appended claims.

In the accompanying drawing I have shown, for the purpose of illustration, one embodiment which my invention may assume in practice.

In the drawing:

Figure 1 is a vertical section through a pickling tank in which the improved protective tube of my invention is incorporated;

Figure 2 is a sectional view taken on the line II—II of Figure 1;

Figure 3 is a sectional view taken on the line III—III of Figure 2; and

Figure 4 is an enlarged sectional view similar to Figure 2 showing temperature recording instrument in place in the protective tube.

The type of pickling tank illustrated for pickling continuous strip metal, and with which my invention is incorporated, consists of a metal tank 2 having an inner wall lining of brick 3 with a rubber inner lining 4 disposed between the inner brick lining and the outer metal walls of the tank.

According to the invention, there is provided, preferably centrally of one of the longitudinally extending side walls intermediate the top and bottom of the tank and on the inside thereof, a recess or opening 5. The recess in this particular type of tank is formed by removing a plurality of bricks at this point. There is provided a lead protective tube 6 which has its bottom portion vertically disposed in the wall of the tank extending downwardly through the bricks above the recess and through the center of the recess, and having its extreme bottom end rigidly secured and anchored in the brick 7 below the recess, thereby firmly holding the lead pipe or tube 6 in position in the tank. The lead pipe or tube in the vicinity of the recess has a plurality of perforations or ports 8 therein through which the pickling solution is adapted to circulate. The pickling solution is circulated in and around the pipe in the vicinity of the recess by movement of the continuous metal strip as it travels therethrough. It is desirable that the lead protective pipe or tube be located substantially in the center of the wall and tank, as the acid and water inlets are located in that position and it is, of course, advantageous to have instantaneous recording of the temperature of the solution immediately after either the acid or the water is added thereto. Also, such a protective tube should be located there for the reason that the steam or heating jets are located in each of the four corners of the tank.

The exposed or upper portion 9 of the pipe above the wall and tank consists of only a half section of pipe and is formed preferably by cutting the same in half longitudinally thereof and is of such length as to extend from the top of the tank to a conduit 10. This exposed end of the pipe is adapted to extend through an opening in the tank cover to the conduit, which commutes with an automatic temperature recording instrument (not shown). Thus, a complete and protected path from the temperature instrument in the bath to the desired point of recording is provided.

It will be understood that the recording element which is connected to the automatic recording instrument control is placed in the lead pipe at 12 and dropped down through the pipe in the wall to the vicinity of the recess and perforated section of the pipe into contact with the pickling solution. It is desirable that this lead pipe be of sufficient size so that the recording element will have clearance when inserted therein to eliminate rubbing of the elements against the inner walls of the pipe.

As a result of this invention, it will be noted that I have provided an improved installation for a protective tube for recording instruments and pickling tanks which will allow the recording of all the variations in temperature at all times and one which safely guards the instrument against damage as the sheet or strip travels therethrough.

While I have shown and described an embodiment of my invention, it will be understood that this embodiment is merely for the purpose of illustration and description and that various other forms may be devised within the scope of my invention as defined in the appended claims.

I claim:

1. A pickling tank, one of the inner walls of said pickling tank having a recess therein, protective means adapted to be securely disposed in said recess through which the pickling solution in the tank is adapted to circulate, and removable means adapted to be inserted in said protective means to determine the temperature of said pickling solution.

2. In combination with a pickling tank, a protective lead pipe vertically and securely disposed in one of the walls thereof, said pipe extending from at least the top of the tank to a recess in said wall intermediate the top and bottom of said tank, said pipe having perforations therein in the vicinity of said recess through which the pickling solution within the tank is adapted to circulate and removable temperature responsive means adapted to be inserted into said pipe and in contact with said pickling solution to determine the temperature thereof.

3. A pickling tank, one of the inner walls of said tank having a recess therein, said recess positioned intermediate the top and bottom of said tank, a protective tube securely positioned in said wall, a portion of said tube disposed in said recess through which the pickling solution in said tank is adapted to circulate, and removable means adapted to be inserted into said tube into the solution therein to determine the temperature thereof.

HARRY C. MORROW.